United States Patent
Bede et al.

(10) Patent No.: US 12,556,029 B2
(45) Date of Patent: Feb. 17, 2026

(54) DUAL SUPPLY OF A BACKUP POWER SUPPLY

(71) Applicant: KK Wind Solutions A/S, Ikast (DK)

(72) Inventors: Lorand Bede, Herning (DK); Paw Rosenvard, Gjern (DK); Martin Krogsgaard, Sunds (DK); Martin Mosberg Christoffersen, Herning (DK)

(73) Assignee: KK Wind Solutions A/S, Ikast (DK)

( * ) Notice: Subject to any disclaimer, the term of this patent is extended or adjusted under 35 U.S.C. 154(b) by 114 days.

(21) Appl. No.: 18/715,576

(22) PCT Filed: Dec. 1, 2022

(86) PCT No.: PCT/DK2022/050256
§ 371 (c)(1),
(2) Date: May 31, 2024

(87) PCT Pub. No.: WO2023/098962
PCT Pub. Date: Jun. 8, 2023

(65) Prior Publication Data
US 2025/0047131 A1    Feb. 6, 2025

(30) Foreign Application Priority Data
Dec. 2, 2021 (DK) .............. PA 202170595

(51) Int. Cl.
*H02J 9/06* (2006.01)
*F03D 9/11* (2016.01)
(Continued)

(52) U.S. Cl.
CPC ............... *H02J 9/062* (2013.01); *H02J 4/00* (2013.01); *H02J 7/0013* (2013.01);
(Continued)

(58) Field of Classification Search
CPC .. H02J 9/062; H02J 4/00; H02J 7/0013; H02J 7/0063; F03D 9/11; F03D 7/0204; F03D 7/0224; F05B 2270/1074
(Continued)

(56) References Cited

U.S. PATENT DOCUMENTS

2014/0054965 A1* 2/2014 Jain .................. H02J 9/062
307/65
2018/0037121 A1 2/2018 Narla
2019/0312441 A1 10/2019 Ballantine et al.

FOREIGN PATENT DOCUMENTS

JP      2016042780    3/2016
WO   WO2010040388    4/2010
(Continued)

OTHER PUBLICATIONS

Danish Search Report from corresponding Danish Patent Application No. PA 2021 70595, dated Apr. 21, 2022, 4 pages.
(Continued)

*Primary Examiner* — Michael R. Fin
(74) *Attorney, Agent, or Firm* — Lee & Hayes, P.C.

(57) ABSTRACT

A power backup system includes a multi phased energy storage and a backup supply. The energy storage includes battery strings, each capable of supplying either an AC or DC voltage to a load. During normal operation, the backup supply is configured for being supplied with an AC voltage from a utility grid and being connectable to a DC voltage supplying battery string of the energy storage. During abnormal operation, the backup supply is configured for, in a first period of time, being supplied from a DC output voltage established by the a first battery string and after expiration of the first period of time being supplied from the AC output voltage established by a second battery string.

20 Claims, 2 Drawing Sheets

Figure 1:
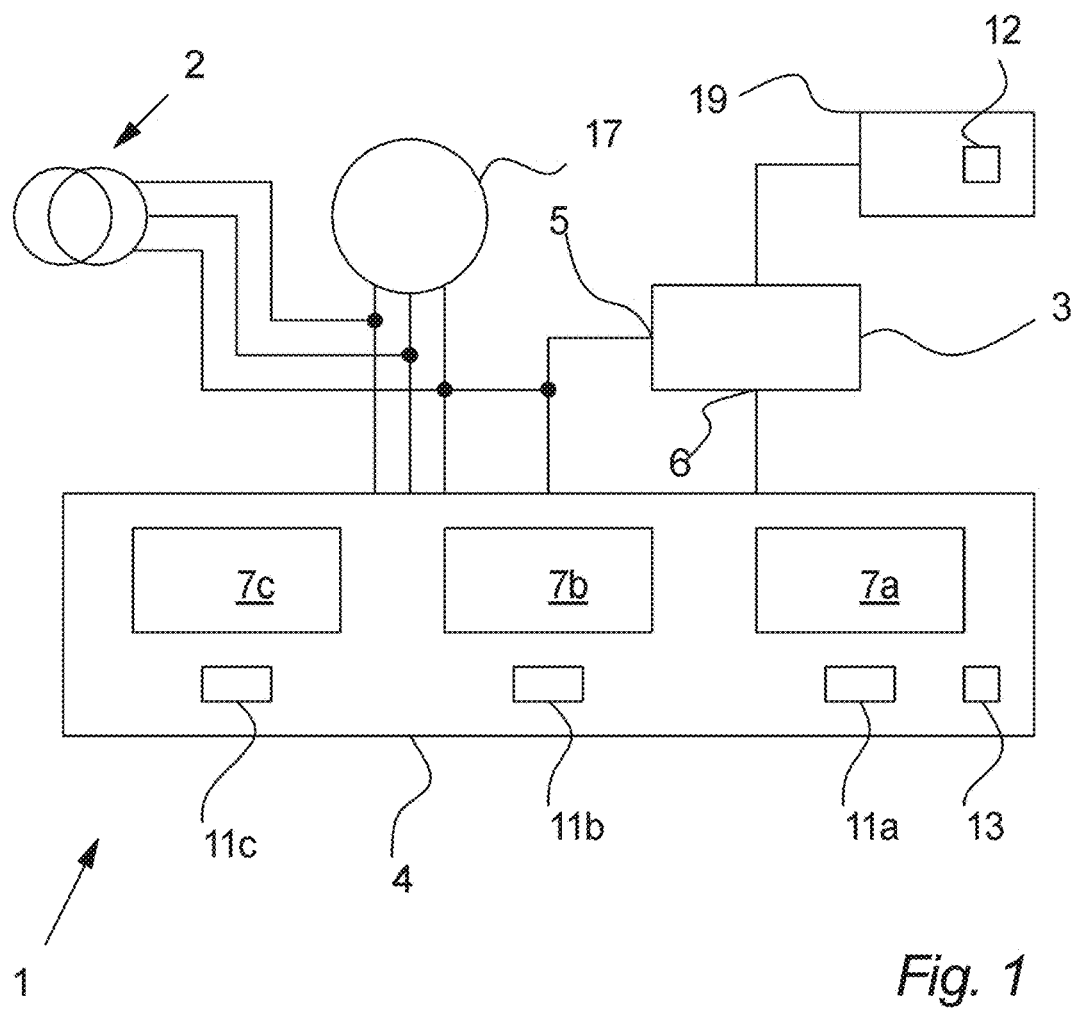

(51) Int. Cl.
  *H02J 4/00*    (2006.01)
  *H02J 7/00*    (2006.01)
  *F03D 7/02*    (2006.01)
(52) U.S. Cl.
  CPC .......... *H02J 7/0063* (2013.01); *F03D 7/0204* (2013.01); *F03D 7/0224* (2013.01); *F03D 9/11* (2016.05); *F05B 2270/1074* (2013.01)
(58) Field of Classification Search
  USPC .............................................. 307/23, 64, 66
  See application file for complete search history.

(56)           References Cited

FOREIGN PATENT DOCUMENTS

| WO | WO2016174117 | 11/2016 |
| WO | WO2019183553 | 9/2019 |
| WO | WO2019223845 | 11/2019 |
| WO | WO2020228919 | 11/2020 |
| WO | WO2021008667 | 1/2021 |

OTHER PUBLICATIONS

PCT Search Report for corresponding PCT International Application No. PCT/DK2022/050256, dated Feb. 24, 2023, 3 pages.

\* cited by examiner

DUAL SUPPLY OF A BACKUP POWER SUPPLY

This claims Application priority to PCT No. Application PCT/DK2022/050256, filed Dec. 1, 2022, which claims priority to DK Patent Application No. PA 2021 70595, filed Dec. 2, 2021, the contents of each of which is incorporated herein by reference.

FIELD OF THE INVENTION

The invention relates to a power backup system facilitating supplying a backup supply with a DC voltage during a first period of time and subsequently with an AC voltage from a multi phased energy storage. This simultaneously with supplying a load, such as a three phased load, with a three phased AC voltage from the energy storage. The invention further relates to a method of controlling such power backup system.

BACKGROUND OF THE INVENTION

Typically, energy systems such as wind turbines need backup supply to essential loads such as yaw and pitch motors which should always be controllable to avoid hazardous situations e.g. in case the mains supply fails. Accordingly, an energy supply, typically in the form of a battery storage, will be present and part of what is typically referred to as an offline UPS (UPS; Uninterruptible Power Supply).

Other loads of a with turbine are critical and therefore requires instant backup power in case the mains supply fail. Therefore typically, a load such as the wind turbine controller need backup power from what is referred to as an online UPS.

The need for backup power supply existing in an energy system such as a wind turbine is therefore considerable. This is leading to increased costs of the wind turbine and over the years to increased expenses to service and maintenance.

SUMMARY OF THE INVENTION

The present invention solves this problem by providing an energy storage that is able to deliver both AC and DC backup supply. The energy storage of the present invention is therefore connectable to several commercial UPS's and loads, thereby the number of battery packs needed for the various power backup systems can be reduced leading to reduced costs and maintenance.

An aspect of the invention relates to a power backup system comprising a multi phased energy storage and a backup supply comprising an AC voltage input and a DC voltage input. The multi phased energy storage comprises at least two battery strings each comprising a plurality of battery modules wherein the connectivity of the individual battery module of the plurality of battery modules to its respective battery string is controllable by a switching arrangement associated with the individual battery module. Wherein the switching arrangements comprises four semiconductor switches in an H-bridge configuration, wherein the switching arrangements of a first battery string are controllable so as to establish a DC output voltage of the first battery string, and wherein the switching arrangements of a second battery string are controllable so as to establish an AC output voltage of the second battery string, wherein during normal operation, the backup supply is configured for being supplied with an AC voltage from a utility grid via the AC voltage input, and being connectable to the first battery string via the DC voltage input, wherein, during abnormal operation, the backup supply is configured for during a first period of time, being supplied, via the DC voltage input, from the DC output voltage established by the first battery string, and after expiration of the first period of time being supplied, via the AC voltage input, from the AC output voltage established by the second battery string.

Such power backup system is advantageous in that it has the effect, that no battery pack including battery monitoring systems, charging control, etc. is needed for the backup supply.

During normal operation and thereby normal supply of the backup supply, the AC input is connected to the utility grid. In case of grid disturbances where the grid is lost or does not comply with requirements to grid quality i.e. during abnormal operation and thereby abnormal supply, the backup supply is supplied either from the DC output from the first battery string or from the AC output from the second battery string.

One reason for establish and connecting a DC voltage and not an AC voltage is that when using AC voltage the battery modules are cycled or on a heavier rotation than when establishing a DC voltage which would lead to loss of life time of the battery cells of the battery modules.

According to an embodiment of the invention, the backup supply is implemented as a 1P-UPS (1P-UPS; 1 phased-Uninterruptible Power Supply), a 3P-UPS (3P-UPS; 3 phased-Uninterruptible Power Supply) or a backup drive.

The implementation of the backup supply depends on the loads of the auxiliary system connected to the backup supply. Hence, if only one phased loads are supplied, an 1P-UPS is sufficient, but if three phased loads are supplied, a 3P-UPS is necessary.

It should be noted, that a one or three phased backup drive can be used as alternative to the one or three phased UPS. A backup drive may comprise a rectifier and an inverter connected with a DC link.

According to an embodiment of the invention, the multi phased energy storage is an off-line uninterruptible power supply and the backup supply is an on-line uninterruptible power supply.

In case the power backup system is providing backup power to loads of a wind turbine, the multi phased energy storage typically would be operated/connected as an off-line UPS (UPS; Uninterruptible Power Supply). Thereby power is facilitated to e.g. yaw or pitch motors or drives hereof in case these motors are not supplied from the wind turbine generator or from the grid.

Further, if the wind turbine is operated in island mode or other situations where the wind turbine is not supplied normal from the grid the position of blades and nacelle can still be adjusted.

Further, in situations where price of energy supplied from the utility grid is high, the wind turbine can be self-supplied with power from the multi phased energy storage.

The multi phased energy storage may be charged either from the wind turbine generator or from the utility grid.

The backup supply would, in case the power backup system is providing backup power to loads of a wind turbine, typically be an on-line UPS supplying the auxiliary system including wind turbine controllers.

According to an embodiment of the invention, a string controller is configured to control switching arrangements of an individual battery string.

Even though one central controller may facilitate the control of switching arrangements in all battery strings, the complexity in data communication and wiring is reduced if one string controller is assigned to control switching arrangements in one string only.

According to an embodiment of the invention, the multi phased energy storage comprises three battery strings.

This is advantageous in that it has the effect, that three phased loads can be supplied from the multi phased energy storage.

According to an embodiment of the invention, the backup supply is configured to supply the string controllers and switching arrangements.

In the embodiment where there are no other power source available than the energy storage the controllers and switching arrangements will be supplied by the energy storage in one way or another. How the controllers are supplied is a design choice hence, an UPS for the controllers of the energy storage may be included.

According to an embodiment of the invention, a controller, during abnormal operation, is configured for controlling electric connection from the battery strings of the multi phased energy storage to one or more loads.

According to an embodiment of the invention, the controller is supplied from the backup supply.

The controller would typically be a controller of an auxiliary system supplied by the backup supply which in case the power backup system is connected to a wind turbine would be a wind turbine controller.

Continuing the example of connection to a wind turbine, the multi phased energy storage would provide a three phased supply to the connected loads. Hence, in the situation where a wind direction reference is received or calculated by the wind turbine controller indicating that the rotor plane is not perpendicular to the wind direction, the wind turbine controller request from the string controllers to deliver AC or DC voltage supply to yaw motors/motor drives to be able to adjust the rotor plane. Keeping the rotor plane perpendicular to the wind direction is advantages in that structural vibrations of wind turbine components can be reduced.

According to an embodiment of the invention, the DC output voltage from the first battery string is disconnected from the DC input when the AC output voltage from the second battery string is connected to the AC input.

In principle, the backup supply can be supplied continuously from either a DC or an AC voltage supply. However in the present invention, since the multi phased energy storage is supplying both the backup supply and e.g. a three phased load simultaneously, the supply of the backup supply is changed from a DC supply to an AC supply.

According to an embodiment of the invention, the first period of time is less than 2 seconds, preferably less than 1 second and most preferably less than 0.5 second Note that a string is only started up in AC for supplying the battery supply if there is a need e.g. in case of a grid fault (also referred to as grid loss). When a grid loss is detected, the change from DC to AC supply can be made within a second. Further, it should be mentioned, that in the situation where a string is dedicated to supply DC to the backup supply, there may be no need to change from DC to AC. However, such additional string adds cost, footprint, maintenance, etc. to the energy storage.

According to an embodiment of the invention, the first period of time terminates when the second battery string is ready to deliver an AC output voltage.

According to an embodiment of the invention, the power backup system, is configured to supply both the backup supply and a three phased load with an AC output voltage simultaneously after termination of a first period of abnormal operation.

As can be understood, the backup supply in an abnormal operation, e.g. in case of fault in the supply from the grid is, in a first period of time, supplied by a DC voltage from one (a first) of the battery strings of the multi phased energy storage. After the first period of time, the backup supply is supplied from another (a second) battery string of the multi phased energy storage.

After the second battery string has been started up to supply an AC output voltage to the backup supply, the first and third battery strings are controlled to enable the multi phased energy storage supply a three phased load. During supply of a load e.g. a three phased load connected to the multi phased energy storage, the multi phased energy storage simultaneously supplies the backup supply and the load. The power consumption from loads connected to the backup supply may be limited compared to the power consumption of the loads connected directly to the multi phased energy storage.

It should be mentioned, that by supply of the backup supply, indirectly the auxiliary system connected to the backup supply is supplied with power.

According to an embodiment of the invention, the first battery string supplying the backup supply is circulated among the battery strings of the multi phased energy storage.

Circulated should be understood as the one battery string supplying the backup supply either by a DC or an AC voltage may change over time which is advantageous in that state of charge of the battery modules of the battery string can be maintained substantially the same and wear of the battery modules may also be kept substantially the same.

Note that it may be possible to include one battery string in heavier rotation that others in the circulation. This may be an advantages if battery modules of that battery string is to be replaced.

According to an embodiment of the invention, wherein, during normal operation, the DC output voltage provided from the first battery string is below the AC voltage provided from the rectifier.

According to an embodiment of the invention, the string controller of the first battery string starting up supplying an AC output voltage is configured to communicate with the string controller subsequently starting the second battery string up supplying an AC output voltage so as to ensure 120 degrees phase displacement between the two AC voltages.

According to an embodiment of the invention, the string controller of the third battery string starting up supplying an AC output voltage is configured to communicate with one or both of the string controller of the first or second battery strings so as to ensure 120 degrees phase displacement between the three AC output voltages.

The communication between string controllers is advantageous in that it has the effect, that a displacement of 120 degrees between the three phases of the three battery strings can be ensures. It should be noted that the 120 degrees is the optimal, but a phase displacement substantially at 120 degrees between the phases are the goal such as 119, 118, . . . , 110 degrees between two of the three phases. The range is design specific, but is preferred to be as close to 120 degree as possible.

The establishing of the AC output voltage is facilitated by control of the switching arrangements i.e. shaping the output by controlling/timing when to connect a battery module to the battery string and thereby contribute to the current path through the battery string and the shaping of the output voltage.

As an alternative to communication directly between string controllers the individual string controllers may also communicate with a power backup system controller. The power backup controller may provide references to the string controllers as to how the individual string controller should control its switching arrangements or information of how the other string controllers controls their switching arrangements. In the latter situation the string controller is to establish its control reference alone based on the received input.

According to an embodiment of the invention, at least one of the AC output voltages are established while the backup supply is supplied with a DC output voltage.

This is advantageous in that an online one phased UPS is provided independent of the control of the three phased load.

According to an embodiment of the invention, the multiphase energy storage described in any of the paragraphs [0006]-[0048] is controlled according to the method described in any of the paragraphs [0050]-[0089].

Moreover, an aspect of the invention relates to a method of controlling a multi phased energy storage, the multi phased energy storage comprises three battery strings each comprising a plurality of battery modules wherein the connectivity of the individual battery module of the plurality of battery modules to its respective battery string is controllable by a switching arrangement associated with the individual battery module. Wherein the switching arrangement comprises four semiconductor switches in an H-bridge configuration. Wherein during normal mode of operation, a backup supply, comprising an AC input and a DC input, is supplied via the AC input from a utility grid and connected, via the DC input, to a first of the battery strings of the multi phased energy storage. Wherein during abnormal mode of operation the backup supply is, during a first period of time, supplied via the DC voltage input by a DC voltage established by the first battery string, and after expiration of the first period of time being supplied, via the AC voltage input by an AC voltage established by a second battery string.

This method of controlling the battery strings of the multi phased energy storage is advantageous in that during an or after the occurrence of an anomaly, such as a grid fault, both the backup supply keeping the controllers of the system, in which the power backup system is connected, alive and simultaneously facilitates supplying loads connected to the multi phased energy storage. This is obtained with one and the same energy storage i.e. the energy storage needed anyway for supplying one or more three phased loads of the system.

Hence, because of the controllable battery modules of the battery strings, a battery pack dedicated to the backup supply is not needed. Even without a battery pack to the backup supply, the battery supply acts as an online backup also referred to as an online UPS (UPS; Uninterruptible Power Supply).

According to an embodiment of the invention, after expiration of the first period of time prior, the switching arrangements of the first and third battery strings are controlled so as to establish an AC output voltage with a phase displacement of 120 degrees to the AC output voltage established by the second battery string.

The sequence of starting of the first and third battery strings are not important, hence the first can be started before the third or the third can be started before the first.

It should be mentioned, that when referring to the first battery string as the source of the DC voltage, this is just an example and could in principle be any of the multiple battery strings of the multi phased energy storage. Following this, when referring to the second and third battery string as being started up in AC, this could in principle also be any of the battery strings.

According to an embodiment of the invention, the duration of the first period of time is determined by need for supplying a three phased load Hence, the duration of the first period of time may vary from seconds until the three phases of energy storage is needed for supplying AC. If no yaw or pitch is needed, then in principle the first period of time could be hours or days.

In other words during abnormal mode of operation the backup supply is, until a three phased AC supply is required from the energy storage, supplied via the DC voltage input by a DC voltage established by the first battery string, and after the request for a three phased AC supply from the energy storage, the backup supply is supplied via the AC voltage input from by an AC voltage established by a second battery string.

The time the backup supply is supplied from the DC voltage from the first battery string i.e. the first period of time, is starting at the occurrence of the abnormality (such as grid fault, loss, not allowed harmonics, etc.) resulting in the grid supply disappears from the AC input of the backup support. The first period of time ends when the supply of the backup supply change to AC voltage on the AC input of the backup support from another battery string. It is possible, but not necessary, to switch supply voltage from DC to AC or start the process i.e. starting up the second or third battery string in AC, just upon the occurrence of the abnormality/loss of grid is detected, but in practise the change of supply voltage can wait until the multi phased energy storage needs e.g. an AC voltage output from each of its three battery strings.

According to an embodiment of the invention, the switching arrangements are controlled by one or more string controllers.

Preferably one string controller is assigned to each battery string and thereby assigned to control the switching arrangements of that particular battery string and thereby control the establishing of the DC or AC voltage. Control here includes switching times to establish a given frequency, magnitude, etc. of the output voltage.

It should be noted that controlling the switching arrangements includes connect, disconnect (bypass) and control polarity of the battery modules connected to the battery string via the switching arrangement.

According to an embodiment of the invention, during normal operation, the DC output voltage is controlled to be lower than the AC voltage.

This is advantageous in that if the grid and thereby the AC voltage supply disappears, the battery string supplying the DC voltage is ready to take over and supply without no start up time thereby enabling on-line UPS functionality to battery supply.

According to an embodiment of the invention, the DC output voltage is controlled by the string controller of the first battery string controlling the switching arrangements of the first battery string.

The DC voltage is controlled by the number of battery modules connected in series in the battery string. The DC voltage level may change depending on the load(s) connected to the backup supply. One way of changing output voltage level (DC or AC in a battery string) e.g. if the DC voltage level (or AC voltage level) is too high or too low, the string controller of the string providing the DC voltage (or AC voltage) can control the connectivity of the individual battery modules to the battery string i.e. change number of battery modules connected in series. Alternatively, the voltage level (independent if it is AC or DC voltage) can be controlled to a desired value required by a load (either directly connected to the multi phased energy storage or via the backup supply) by utilizing PWM (PWM; Pulse Width Modulation) control. Input to the PWM control can be either SoC (SoC; State of Charge) (regulation needed if SoC is low in a battery), temperature (regulation is needed if temperature of a battery is to high), increased or decreased requirements to voltage or current, etc.

This way of controlling the battery modules of the battery strings is advantageous in that it has the effect, that no battery packs are needed for the uninterruptible power supply. This leads to a reduction in cost and complexity of the UPS system as no battery monitoring system is needed, the foot print of the 1P-UPS system is reduced and so on.

According to an embodiment of the invention, the multi phased energy storage is backup power supply of loads of an energy generation system such as a renewable energy generation system or a photovoltaic system.

The present invention is advantageous in that it has the effect, that the multi phased energy storage can be used both as a one phased DC or AC supply to a commercial UPS thereby providing online UPS functionality and as a three phased DC or AC supply to loads of the energy generation system thereby providing offline UPS functionality.

Further, the present invention is advantageous in systems that need an UPS in that such UPS can be implemented without a dedicated UPS battery pack.

The energy generation system could be any energy generation system including renewably energy generation systems such as wind turbines, wind farms, photovoltaic, hydrogen generation systems and the like.

More specifically, the same multi phased energy storage is able to supply the same commercial UPS with both a DC voltage and an AC voltage. Further, the same multi phased energy storage can supply both a one phased load such as an UPS and a three phased load such as an UPS simultaneously. Thereby the present invention facilitates supplying both an online UPS functionality and an offline UPS functionality at the same time.

According to an embodiment of the invention, the second and/or the third battery strings can be started up as AC voltage supply before the first battery string is disconnected from the DC input.

This is advantageous in that it has the effect, that the backup support is always supplied from the multi phased energy storage.

According to an embodiment of the invention, the backup support is a commercial uninterruptible power supply without battery supply.

Typically commercial UPS's includes a battery supply, however as explained above, this is not necessary to maintain online UPS functionality according to the present invention.

According to an embodiment of the invention, the DC input is connected to the DC link between a rectifier and an inverter of the backup supply.

According to an embodiment of the invention, the control of the switching arrangements of the first and third battery strings is synchronized with the control of the switching arrangements of the second battery string so as to together supply a three phased AC load.

In this way a three phased load can be supplied from the energy storage. It should be mentioned, that in case the backup supply is three phased, the backup supply can be supplied with the same three phased as the AC load.

According to an embodiment of the invention, the control of the first and third battery strings are synchronized to each other and to the second battery string so as to facilitate a 120 degrees displacement between the AC voltage outputs of battery strings.

The synchronization of 120 degrees is advantageous in that in this way, a standard three phased AC voltage at frequencies of e.g. 50 Hz or 60 Hz can be established for loads of the energy system.

According to an embodiment of the invention, the synchronization is controlled by an energy storage controller and/or by the three string controllers.

Typically, an energy storage controller is present to coordinate and select which of the battery strings that should be the first, second and third i.e. deliver AC or DC voltage output at a given time at a given level with a given frequency. In this case, the string controllers of the individual battery strings are communicating with the energy storage controller to receive reference for the control of the switching arrangements of the respective battery strings. It should be mentioned, that the string controllers may also communicate with each other.

According to an embodiment of the invention, at least a first part of an auxiliary system connected to the backup supply is supplied from the DC or AC voltage established by one of the first, second and third battery strings during abnormal mode of operation.

The first part of the auxiliary system would typically be one or more controllers of a control system of an energy generation system. Hence, if the energy system is a wind turbine, the controllers would be referred to as wind turbine controllers. Again, abnormal mode of operation may be defined e.g. as when there are no grid supply to the backup supply According to an embodiment of the invention, a yaw motor, hydraulic pump or a pitch motor connected to the multi phased energy storage is supplied from the AC voltage established by the first, second and third battery strings during abnormal mode of operation.

The control of motors for controlling e.g. yaw or pitch in case the multi phased energy storage is connected to a wind turbine, is advantageous in that direction of the rotor plan of the wind turbine can be adjusted according to a changing wind direction. Again, abnormal mode of operation may be defined e.g. as when there are no grid supply to the loads/motors.

According to an embodiment of the invention, where said multi phased energy storage comprises four battery strings of which a first, second and third battery string are supplying power to a load and a fourth is being charged from a power source, wherein said method comprising the following steps of rotation of said first and fourth battery strings: connecting said fourth battery string in parallel with said first battery string, and disconnect said first battery string from said fourth battery string.

This is advantageous in that it has the effect, that simultaneous charge and discharge of the energy storage is facilitated. If the fourth is being charge e.g. from the grid or other power sources prior to the rotation of strings, the fourth battery string is being disconnected from the power source prior to being connected in parallel to the first string. Further, if the first string needs to be charged e.g. by being connected to the grid, wind turbine generator or the like after being disconnected from the paralleled connection to the fourth string. The first string is being connected to such power supply.

According to an embodiment of the invention, the method of controlling a multi phase energy storage described in any of the paragraphs [0050]-[0089] is implemented in a multiphase energy storage as described in any of the paragraphs [0006]-[0048].

Moreover, an aspect of the invention relates to a wind turbine comprising a power backup system according to any of the claims of this document.

THE DRAWINGS

Figure 2:
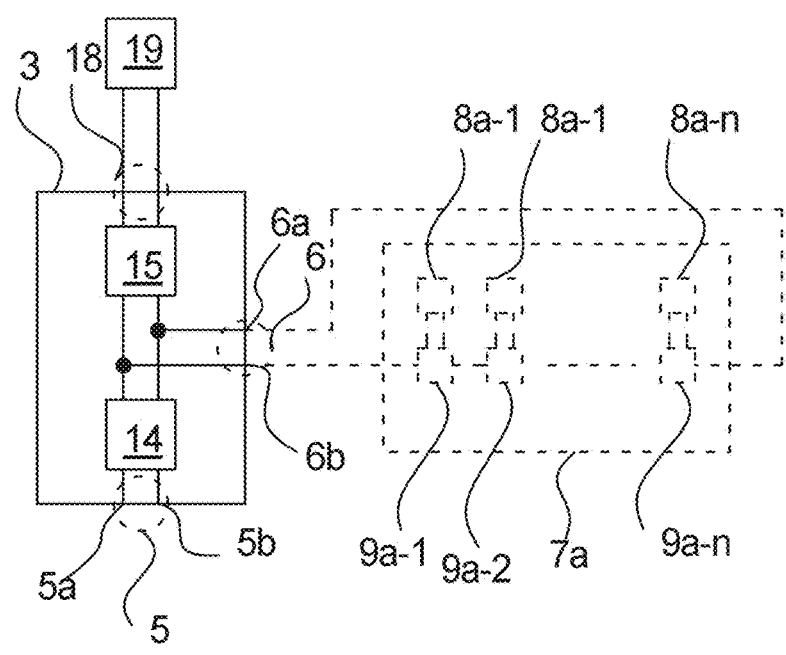
Figure 3:
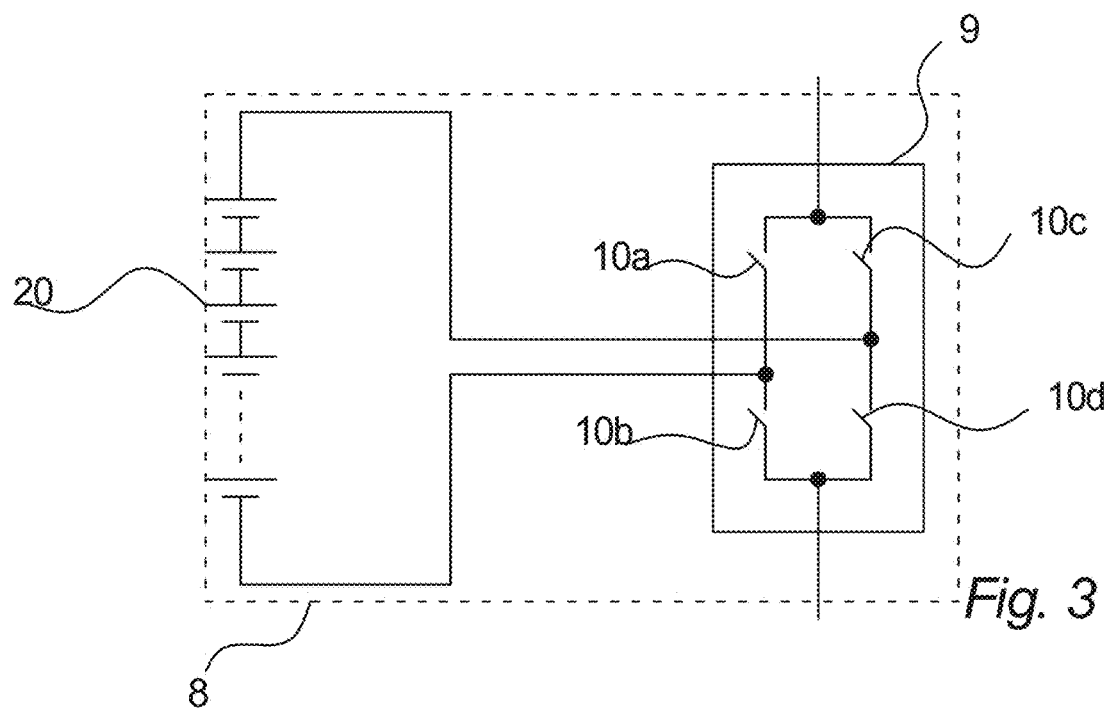
Figure 4:
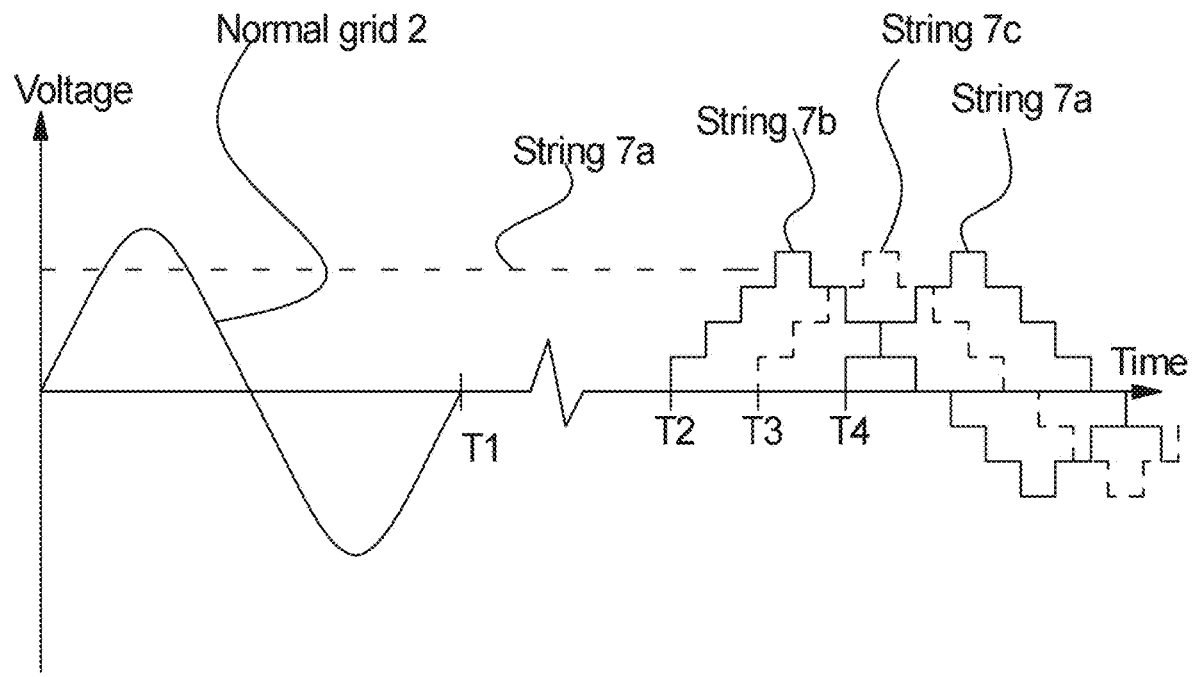

For a more complete understanding of this disclosure, reference is now made to the following brief description, taken in connection with the accompanying drawings and detailed description, wherein like reference numerals represent like parts:

FIG. 1 illustrates a power backup system according to an embodiment of the invention, FIG. 2 illustrates an example of a battery string and backup supply, FIG. 3 illustrates an example of a battery module, and FIG. 4 illustrates an example of supply of DC and AC voltage to the backup supply and three phased load.

DETAILED DESCRIPTION

FIG. 1 illustrates the above-described power backup system according to an embodiment of the invention. A multi phased energy storage 4 (herein after referred to simply as energy storage 4) is illustrated with three battery strings 7a-7c, three string controllers 11a-11c and an energy storage controller 13. The energy storage 4 is connected to a load 17 and to a DC input 6 and an AC input 5 of a backup supply 3. The backup supply can be implemented/referred to as a commercial UPS, a backup drive, an inverter, etc. The backup supply 3 is connected to an auxiliary load/system 19 and is supplied from a utility grid 2. The utility grid 2 is also connected to the load 17.

It should be noted that several contactors are needed in a system like the one illustrated in FIG. 1, but for simplicity, none of these contactors are illustrated. The purpose of these contactors is to connect or disconnect electric flow paths between grid, load, energy storage and backup supply. Such control is not an essential part of the present invention and therefore not disclosed in any details and further, such control is known by a person skilled in the art.

As mentioned, the power backup system may be implemented as a power backup system for loads in a wind turbine. Therefore, with a wind turbine as an example of an electric generation system, the present invention will be described without limiting the scope of protection to a power backup system implemented in a wind turbine.

It should be mentioned, that having three phases in the energy storage 4 as illustrated in FIG. 1 would be a typical implementation of the present invention in a wind turbine. This is because a wind turbine comprises three phased loads that does not need power all the time (only when e.g. pitch or yaw is needed). In other applications or in other embodiments two phases/strings are enough, e.g. one for supplying DC to the backup supply 3 when there is grid and one in stand by (provided that there are single phase loads which can be offline). In this embodiment, when the grid disappears, the string in standby starts in AC and supplies the backup supply 3 until it is depleted. Then the string first supplied the backup supply 3 with DC will take over and continue supplying the backup supply 3 in AC.

The change between the DC and AC supply to the backup supply 3 from the different strings is in an embodiment controlled by the energy storage controller that commands the string controller to shift from DC to AC and vice versa. Further, the energy storage controller may also control switched (not illustrated) between the strings of the energy storage 4 and the backup supply 3. It should be mentioned that all strings of the energy storage 4 may in principle be connectable to both the DC and AC input 5, 6 of the backup supply 3.

Accordingly, in an embodiment one string first supplies the backup storage 3 with DC and subsequently with AC. Between the two different supply voltages a second string supplies the battery storage 3 preferably with AC, or alternatively with DC. In an embodiment, within a given mode of operation, such as grid fault mode of operation, one string may supply both DC and subsequently AC to the battery storage 3.

In FIG. 1 only three strings are illustrated, and this is because the illustrated energy storage is designed to be able to supply a three phased load. But in principle the energy storage could have 4 or 6 or more strings (one string may be implemented in one electric cabinet). In such situation, the string supplying the DC to the backup supply 3 may stay in DC mode. If there are three strings left beside the DC supplying string, these can be used to supply the three-phase load. Having e.g. four strings is advantageous because then the capacity of all four strings can be utilize e.g. for supplying the controllers of the wind turbine (or the system in which the energy storage 4 is implemented), thereby keeping the controllers alive for a longer period of grid loss. Still, if needed three strings can be used for supplying a three phased load. Therefore, if there is an overload on the three phased load, the supply for the controllers is not lost. In the embodiment with only three strings there is a risk that in a three-phase overload situation the system trips and the power to the controllers is lost and the wind turbine (or system in which the energy storage is implemented) cannot be restarted.

An energy storage having four strings would also be advantageous in that the capacity of the energy storage would be increased. Further, the embodiment with a four or more stringed energy storage, has the advantage that a three phased output (DC or AC) can be provided simultaneously with one string is being charged. The charging power may come from the grid, wind turbine generator, solar system, etc.

One way of such simultaneous charging and discharging of strings from the energy storage can be circulating the string to be charge e.g. every 10, 15, 20, 25, 30, etc. minute. Hence, at time T1 String 1 is providing AC out Phase L1 e.g. 30 A, String 2 is providing AC out Phase L2 e.g. 30 A, String 3 is providing AC out Phase L3 e.g. 30 A and String 4 is charging from AC (or DC) e.g. 100 A. Then after a predetermined period of time or dynamic time period e.g. determined by SoC of one or more battery strings e.g. denoted T1 String 1 is charging from AC (or DC) e.g. 100 A, String 2 is providing AC out Phase L2 e.g. 30 A String 3 is providing AC out Phase L3 e.g. 30 A, and string 4 is providing AC out Phase L1 e.g. 30 A. Then after another period of time e.g. denoted T2 String 1 is providing AC out Phase L2 e.g. 30 A, String 2 is charging from AC (or DC) e.g 100 A, String 3 is providing AC out Phase L3 e.g. 30 A and String 4 is providing AC out Phase L1 e.g. 30 A. Then after another period of time e.g. denoted T3 String 1 is providing AC out Phase L2 e.g. 30 A, String 2 is providing AC out Phase L3 e.g. 30 A, String 3 is charging from AC (or DC) e.g 100 A and String 4 is providing AC out Phase L1 e.g. 30 A. The sequence is not important, the important is that one string is being charged and thereby is not supplying/is not capable of contributing to the output of the energy storage.

An embodiment as described with four or more strings has the advantage that the input is isolated from output, thus there is no issue with low voltage input and high voltage input. Accordingly, if four strings is present and three is delivering power to the load while one is being charge. Then the three strings delivering power is isolated from the mains and they are "grid forming" so to speak. Therefore, they are in voltage control mode and not connected galvanically to the input. The one string being charged is in current control mode and connected to the grid (which can be ⁵⁰⁄₆₀ or 16 ⅔ Hz). When the one is charged or one of the three need to be charged, then a rotation may take place. Hence, then strings are rotated by connecting the fourth (the one that was being charged) in parallel with one of the other three that should be replaced. Then this fourth is disconnected and can be connected to the grid for being charged. By doing so, the input can have 50 Hz and the output 60 Hz or any other combination.

The function of the backup supply 3 is typically to act as an online UPS i.e. to be able to take over the supply of loads of the auxiliary system instantly or within milliseconds from when grid supply is lost. This is to ensure power is always on to particular controllers, to be able to control essential parts of the wind turbine (such as pitch and yaw motors) and e.g. to be able to communicate with the wind turbine from a remote location. Other loads that would need power in case of loss of grid could include light, sensors and others that are controlled or provides feedback to the controller(s) of the wind turbine.

In the power backup system 1 of the present invention, the backup supply 3 does not, as in prior art systems, include a battery pack. Instead, it is connected to one of the strings 7 of the energy storage 4 and from this string it is able to supply the loads of the auxiliary system 19.

The energy storage 4 is needed in e.g. a wind turbine to supply larger loads, loads that may be part of the auxiliary system 19. Such loads in a wind turbine are typically larger loads such as yaw and pitch motors that cannot be powered from a conventional commercial UPS i.e. what in the prior art is comparable to the backup supply 3.

During normal operation, the backup supply 3 is, in an embodiment, as mentioned, supplied with an AC voltage from the grid 2 to be able have the function as an online UPS. At the same time, the backup supply 3 is supplied with a DC voltage from one of the strings 7 of the energy storage 4. In this way, if the grid supply is lost, the auxiliary system 19 can be powered from, and typically via, the energy storage 4.

To ensure that consumption from the auxiliary system is taken from grid during normal operation, the DC voltage on the DC input 6 may be controlled by a string controller 11 or energy storage controller 13 to be just below the voltage level of the DC link of the backup supply 3. This DC link voltage may also referred to the rectified AC voltage.

In an embodiment, a not illustrated diode is inserted which doesn't allow the power to flow to the battery from the grid. In another embodiment, the strings could be control in a way (the string voltage) to not absorb power from the backup supply and thereby indirectly from the grid if the measured DC link voltage is above a limit. If the measured DC voltage is below a voltage limit the string starts to supply. In this way, the diode may be considered superfluous. The backup supply 3 may be implemented in at least two different ways. The first as a commercial UPS but where the battery pack is not included. Typically, a battery pack of a commercial UPS is of a lead acid type which has a certain lifetime. Hence, a commercial UPS with battery pack is associated with expenses to maintenance and uncertainty related to functionality when getting close to its end of lifetime. Therefore, the present invention suggests to supply a DC voltage from the energy storage needed anyway to supply three phased AC loads. This is possible due to the control of the string voltage as will be described below. The DC voltage is supplied e.g. at the terminals at which the DC battery was connected. The backup supply 3 can be implemented as a commercial UPS, either a three or single phased commercial UPS.

An alternative implementation of the battery supply 3 is what is referred to as a drive comprising a rectifier 14 and an inverter 15 connected via a Dc link 16 (see FIG. 2). The drive illustrated on FIG. 2 comprises a rectifier 14 for rectifying an AC voltage input at the AC input 5 to a DC voltage that via a DC link 16 is supplied to an inverter 15. Via the inverter 15 the DC voltage can be shaped to a desired voltage and frequency required by the loads of the auxiliary system 19. The voltage and frequency are controlled by a backup controller (not illustrated) that is controlling the switches of the inverter 15 according to a reference that may be predetermined and may be stored in a memory of the backup supply controller.

It should be mentioned that technical features that are known by the skilled person but not essential to the present invention is not always illustrated in the figures. An example is that a DC link capacitor (not illustrated) is typically connected in the DC link between the rectifier 14 and the inverter 3.

On FIG. 2 is also illustrated in further details the DC input 6 connection to a battery string 7*a*. As illustrated, a terminal 6*a* is connected to one end of the battery string 7*a* such as to a positive battery string potential. A terminal 6*b* is connected to the other end of the battery string 7*a* which then is a negative battery string potential. This may obviously change either by switching the electric connections or by reversing polarity of the battery modules 8 in the battery string 7*a*. The battery string 7*a* comprises a plurality of battery modules 8*a*-1, 8*a*-2, . . . , 8*a*-*n* each associated with a switching module 9*a*-1, 9*a*-2, . . . , 9*a*-*n*.

In the same way other battery strings such as 7*b* and 7*c* of FIG. 1 also is build up with a battery modules 8 mutual connectable via switching modules 9.

In the same way the AC input 5 and the auxiliary output 19 may also comprise two terminals.

In principle, the duration of a first period of time after loss of power from the grid can last until the battery string supplying the DC voltage to the battery supply is required for supply of AC voltage. Hence the duration of the first period of time is dynamic and is e.g. depending on wind speed and wind direction i.e. if a yaw motor need power to turn the nacelle.

Further, it should be noted that if for some reason it is preferred to supply the backup from a DC source, then after having supplied the AC load, then the battery string can turn back to supply DC voltage again to the backup supply 3.

The load 17 represents loads of the wind turbine that does not require continuous power supply i.e. loads that only needs power supply when used. Examples of this kind of loads could be motors for driving e.g. the yaw of the nacelle and pitch of blades. A load may also be hydraulic pumps (some wind turbines use hydraulics for pitch), lights, heating elements, dehumidifiers (these in the case that the wind turbine controller knows that the grid will appear in a certain time and has enough energy left in the batteries to prepare the turbine for operation), etc. Hence, a load can be any kind of loads of a wind turbine.

The auxiliary system 19 of a wind turbine may also be referred to as a load/comprising several loads. In reality, the auxiliary system 19 comprises several loads many of which needs power to reduce wear of the wind turbine with the wind turbine e.g. is off grid. Examples of these loads are power modules such as switch gear for connecting and disconnecting the wind turbine to the grid, control and safety systems, control and communication systems, condition monitoring system sand, cooling and heating systems etc. It should be noted, that sometimes yaw and pitch systems are also referred to as being part of the auxiliary system 19. Hence, some loads of the auxiliary system need to be connected to an online UPS and some only need to be connected to an offline UPS.

In an embodiment, the connectivity of each of the battery modules 8 of a battery string 7 to the battery string and thereby its contribution to output voltage can be controlled individually by controlling status of the switches 10 of the switching module 9. A battery module 8 with associated switching module is illustrated on FIG. 3.

Depending on the required capacity and voltage, a battery string can be implemented in an electric cabinet or more than one battery strings can be implemented in the same electric cabinet. With respect to the control of the switching modules 9, typically one string controller 11 is assigned to one battery string 7. However, an energy storage controller 13 may control all battery strings of an energy storage 4. With this said, typically the energy storage controller 13 coordinates the control of the string controllers 11 and communicates to controllers external/remote to the energy storage 4.

The output voltage of a battery string 7, whether it is a DC or an AC voltage, is established by a number of battery modules connected in series in the battery string 7 and sometimes also how these are connected (with respect to polarity). The voltage level (amplitude) may be controlled in dependency of the load(s) connected to the backup supply. One way of changing output voltage level (DC or AC in a battery string) if e.g. the DC voltage level (or AC voltage level) is too high or too low is to control connectivity of the battery modules 8. This may be done by the string controller of the string providing the DC voltage (or AC voltage) so that the number of individual battery modules connected together in series (or parallel) forming a battery string is changed. Alternatively, the voltage level (independent if it is AC or DC voltage) can be controlled to a desired value required by a load by utilizing PWM (PWM; Pulse Width Modulation) control. Input to the PWM control can be either SoC (SoC; State of Charge) (regulation needed if SoC is low in a battery), temperature (regulation is needed if temperature of a battery is to high), increased or decreased requirements to voltage or current, etc.

Note that, the battery string(s) can be controlled in the same way whether a one or three phased backup supply 3 or load 17 is supplied or if the load is directly connected to the multi phased energy storage or via the backup supply 3 or connected to the grid which primarily is used for charging the storage 4. With this said, the storage 4 may be controlled to deliver power (reactive or active) to the grid.

The battery string 7*a* illustrated on FIG. 2 comprises a first battery module 8*a*-1, a second battery module 8*a*-2 and up to n battery modules 8*a*-*n* each including a plurality of battery cells 20 (see FIG. 3). The battery modules 8 can be bypassed when the switches 10 (not illustrated in FIG. 2) of the associated switching modules 9*a*-1, 9*a*-2, . . . , 9*a*-*n* are in a bypassing sate or included in a current path running through battery modules 8 connected in the battery string 7.

It should be mentioned that not all support or safety elements are illustrated in the figures. An example is that a fuse (not illustrated) may be inserted between the battery module 8 and the switching module 9.

The status of the switches 10 is controlled by the string controller 11 communicating with the switches 10 via control signal path. The string controller 11 is preferably also connected to an energy storage controller 13 or an external controller which may be implemented as a wind turbine controller, wind park controller (controller of the system in which the power backups system is used). The string controller 11 may be a standard industrial logic controller such as a PLC (PLC; Programmable Logic Controller) including or connected to relevant sensors, memory, processing units, etc. Hence, the string controller 11 may control the switches of a battery string according to a control reference received, a one or more voltage measurements (of string 7 or module 8) and a current measurement (of string 7).

The current path is preferably galvanic separated from the control signal path in order not to disturb the control of the status of the switches 10. The galvanic separation may be established at the string controller 11, however this is just an example, and it could as well be at the battery string 7, at the battery modules 8 or the printed circuit board (if any) on which the switches 10 are mounted. The galvanic separation can be established by optic data communication, optoelectrical data communication, by means of a transformer. The series connection of battery modules 8 is referred to as a battery string 7. An energy storage 4 may comprise more strings and in this case preferably each string has its own controller 11. In this case these string controllers 11 may communicate with an energy storage controller 13 which again may communicate with the external controller.

The number of battery modules 8 of a battery string 7 may vary between 1 and 25 or even more, typically the battery modules 8 are series connected in columns in the battery string 7 where each column typically comprises between 5 and 20 battery modules 8. Modules 8 or strings 7 may be connected in parallel. The number of battery modules 8 and thereby battery cells is determined by the desired voltage over the battery string 7 which is preferably higher than the peak voltage of the grid 2 or the peak requirement from a load to be supplied. The storage capacity of the battery string 7 is determined by the system in which the battery string is used. Further, the number of battery cells of the battery modules 8 may vary like the battery modules does not have to be identical within the energy storage 4 and even not within the strings 7. Just as long as the string controller 11/energy storage controller 13 is updated with information of the individual battery module (type, voltage, temperature, just to mention a few).

Preferably, the switches 10 are semiconductor switches 10 of the IGBT (IGBT; Insulated Gate Bipolar Transistor), MOSFET (MOSFET; Metal-Oxide-Semiconductor Field-Effect Transistor) type, GaN transistors (Gan; Gallium Nitride) or SiC transistors (SiC; Silicon Carbide), however other types of switches can also be used.

Preferably, commodity switches 10 are chosen in that they are well tested and low in price. The commodity switches are typically not designed for operation in high voltage (e.g. above 1000V) and with high currents (e.g. above 500 A) so the number of this type of switches is higher compared to designs using switches designed for higher voltage and currents. However, the increased number is compensated by the lower price of the commodity switches. A preferred type of switch 10 for use in the present invention is designed to currents of 100 A and voltages of 50V. At higher voltages of the preferred types of switches, the on-resistance of the semiconductor switch 10 is increasing and thereby the power loss in the switch 10.

Preferably, a reference to battery module 8, is a reference to a plurality of battery cells 20 connected in series and/or parallel. The number of battery cells may vary, between 2 and 25 or even more in one column of series connected battery cells within one battery module 8. A typical column comprises between 10 and 20 series connected battery cells. Note that blocks of paralleled battery cells may be connected in series, then the configuration of the battery cells 20 in a battery module is flexible.

The battery cells 9 are preferably of the li-ion type since the characteristics of this battery type complies with the requirements of the energy storage 4 and the environment of e.g. a wind turbine. With this said, other battery types may also be used. As an example, one battery cell, may be a 3.2V element which when connected with e.g. 14 similar cells leads to a 48V battery pack within one battery module 8. Hence in this example, the battery module 8 comprise one 48V battery which can be controlled by the switches 10 to other battery modules 8 in the string 7. The capacity of the battery modules is preferably between 10 Ah and 200 Ah or even higher, but as mentioned this is a design choice based on requirements to the energy storage 4 and prices of the system 1.

As mentioned, the output voltage of a battery string 7 may be controlled by a string controller 11. During normal operation, the DC output voltage of the one string 7 is controlled to be just below the DC link voltage at the backup supply 3. When it is detected that the supply via the AC input is lost, the inverter 15 draws power from the battery string 7 providing the DC voltage. In this so-called abnormal mode of operation, the loads connected to the backup supply 3 can be supplied from the battery string 7 providing the DC voltage of from another battery string 7 via the AC input. The period of time in which the battery supply 3 is supplied from the DC input can be any time period. Only limiting factors are the capacity (SoC) of the battery modules of the battery string and if the string is needed for providing an AC supply to another load.

In the latter situation, prior to the need of an AC output voltage from the DC supplying battery string 7a, another battery string 7b is started up in AC and connected to the AC input 5. In this way, when disconnecting the DC supplying battery string 7a, the backup supply 3 is continued to be supplied from the other battery string 7b.

Then upon terminating the first period of time, the DC supplying string 7a is started up to supply an AC voltage. After this, the energy storage 4 is able to establish a three phased power supply to a load.

It should be noted that the two phases that is needed beside the one string 7b supplying the backup supply 3 is started up with reference to that battery string 7b. In this way a 120 degrees phase displacement of the three phases 7a, 7b, 7c can be established. Note that if the string 7c is already started up in AC, the string 7b can be started up according to string 7c with a 120 degrees phase displacement. When the string 7a then is started up in AC, this is done with reference to either string 7b or 7c. This is, in an embodiment, possible because of communication between string controllers 11 and/or energy storage controller 13. In another embodiment, the phase displacement can be controlled by having one "master sting" and two "slave strings". The slave strings then measure the master string voltage and output theirs slave string voltage with 120 degree phase shift to the master string voltage.

FIG. 4 illustrates the supply of the backup supply 3 from the energy storage 4. Until time T1, the supply is from the normal grid i.e. the AC voltage from the grid 2. As illustrated, the string denoted 7a is also connected to the backup supply with a voltage that is below the grid voltage (also referred to as the rectified AC voltage as described above). At time T1, the grid supply is lost and the supply continues from the DC voltage from string 7a. The time period during which the backup supply 3 is supplied with a DC voltage from string 7a is also referred to as the first time period. The duration of the first period is in the example illustrated in FIG. 4 starting at time T1 and ending at time T3.

At time T2, the string 7b is started in AC which is subsequently taking over the supply of the backup supply 3 from the string 7a. String 7b is started up because e.g. a three phased AC load is to be supplied i.e. AC from all of the strings 7a, 7b and 7c is required.

At time T3 and T4, the string 7c and 7a respectively are started up in AC thereby facilitating supplying a three phased AC load simultaneously with supplying the backup supply 3.

On FIG. 4, the so-called first period of time is the time between T1 and the time where string 7b is ready to take over the supply of the backup supply 3 from string 7a. String 7b is at earliest ready from time T2 and from there the backup supply 3 can be supplied from string 7b. Until string 7b is ready, string 7a is supplying the backup supply with an AC voltage.

During normal operation of the wind turbine, the generator of the wind turbine generates power which is supplied to the grid 2 when the wind is above a cut-in wind speed. When the wind is below the cut-in wind speed, the generator may also produce power, which then can be used to supply loads in the wind turbine including charging battery modules of the energy storage 4.

When the wind speed is below a speed, where power can be generated, the loads 3, 4, 17, 19 of the wind turbine is supplied from the grid 2 or the loads 3, 17, 19 can by supplied from the energy storage 4. Hence, a wind turbine controller 12 can (directly or indirectly) control contactors and thereby power supply to e.g. a yaw or pitch motor. In this way, a nacelle and/or a blade can be turned to a desired position with reference to e.g. a wind direction. The contactors are not illustrated, but are located in the electric connections between the energy storage 4 and the load 17/the backup supply 3 and between the backup supply 3 and auxiliary system 19.

In abnormal mode of operation e.g. if the grid connection is lost, so is the power to the loads 3, 4, 17, 19 and then the power backup system 1 is taking over the supply of the loads. The first and most important is the controllers i.e. the wind turbine controller 12 in that the wind turbine controller needs to be powered up to be able to start up the wind turbine, rotate nacelle or blades, etc.

In abnormal mode of operation, the wind turbine controller 12 is supplied from a DC or AC voltage established in a string 7 of the energy storage 4 via the backup supply 3. With respect to the wind turbine controller 12, the backup supply 3 operates as an online UPS.

The abnormal mode of operation may be detected by readings from a voltage sensor that measures grid voltage and/or grid frequency. This measurement can be compared to a threshold value and if below, an abnormal mode of operation situation occurs.

In addition, the monitoring of the grid 2 is also used to determine the DC voltage output supplied to the DC input 6 during normal mode of operation. Hence, this sensor input is used as reference to the string controller 11*a* controlling the string 7*a* providing the DC output voltage.

Loads 17 that only requires power when operated is supplied from the energy storage 4 e.g. by controlling contactors. With reference to this kind of loads 17, the energy storage 4 is operated as an offline UPS.

From the above it is now clear, that the present invention relates to an energy storage 4 which in a preferred embodiment, comprises three battery strings 7. Each battery string 7 comprises a plurality of battery modules 8. The battery modules 8 are individually controllable via switching arrangements 9 so as to control connectivity of battery modules 8 of a string 7 to each other. The battery modules 8 may be bypassed, connected with a first polarity or with a reversed polarity. In this way either an AC or a DC output voltage can be established from each of the strings 7.

This battery string control is used to provide a backup supply 3 with a DC backup voltage meaning, that if the mains AC voltage is lost the DC backup voltage established by one of the strings are used as supply for the loads connected to the backup supply 3.

If or when a three phased load 17 requires power, the DC voltage supply to the backup supply 3 is changed to an AC voltage by connecting a string with AC output voltage to the AC input 5 coordinated with disconnecting the string providing the DC voltage.

Subsequently, the former DC suppling string is controlled to establish an AC voltage. The now three AC voltage supplying battery strings are controlled with reference to each other to ensure a phase displacement of substantially 120 degrees.

In this way one of the strings are supplying both a three phased load 17 and the backup supply 3. Thereby, the backup supply 3 can be implemented in e.g. a wind turbine without a battery pack.

Finally, with the above described invention, it is possible to supply controllers of a wind turbine longer i.e. keeping them alive for a longer timer period than conventional backup systems. This is because, if the string which is used to provide DC power to the backup supply gets low on SoC, it is possible to switch the supply of the backup supply to another string and continue the supply. Hence, in the storage 4 of the present invention the full battery capacity can be utilizes to supply the controllers only.

LIST

1. Power backup system
2. Utility grid
3. Backup supply
4. Multi phased energy storage
5. AC input
6. DC input
7. Battery string
8. Battery module
9. Switching module
10. Switch
11. String controller
12. Auxiliary controller
13. Multi Phased energy storage controller
14. Rectifier
15. Inverter
16. DC link
17. Three phased load
18. Backup supply output
19. Auxiliary load
20. Battery cells

The invention claimed is:

1. A power backup system comprising:
a multi phased energy storage, and
a backup supply comprising an AC voltage input and a DC voltage input,
the multi phased energy storage comprises at least two battery strings each comprising a plurality of battery modules wherein the connectivity of the individual battery module of the plurality of battery modules to its respective battery string is controllable by a switching arrangement associated with the individual battery module,
wherein the switching arrangements comprises four semiconductor switches in an H-bridge configuration,
wherein the switching arrangements of a first battery string are controllable so as to establish a DC output voltage of the first battery string,
wherein the switching arrangements of a second battery string are controllable so as to establish an AC output voltage of the second battery string,
wherein during normal operation, the backup supply is configured for:
being supplied with an AC voltage from a utility grid via the AC voltage input, and
being connectable to the first battery string via the DC voltage input, and
wherein, during abnormal operation, the backup supply is configured for:
during a first period of time, being supplied, via the DC voltage input, from the DC output voltage established by the first battery string, and
after expiration of the first period of time being supplied, via the AC voltage input, from the AC output voltage established by the second battery string.

2. The power backup system according to claim 1, wherein the backup supply is implemented as a 1P-UPS, a 3P-UPS, or a backup drive.

3. The power backup system according to claim 1, wherein the multi phased energy storage is an off-line uninterruptible power supply and the backup supply is an on-line uninterruptible power supply.

4. The power backup system according to claim 1, wherein the backup supply is configured to supply the string controllers and switching arrangements.

5. The power backup system according to claim 1, wherein a controller, during abnormal operation, is configured for controlling electric connection from the battery strings of the multi phased energy storage to one or more loads, and
wherein the controller is supplied from the backup supply.

6. The power backup system according to claim 1, wherein the DC output voltage from the first battery string is disconnected from the DC input when the AC output voltage from the second battery string is connected to the AC input.

7. The power backup system according to claim 1, wherein the first period of time is less than 2 seconds, or
wherein the first period of time terminates when the second battery string is ready to deliver an AC output voltage.

8. The power backup system according to claim 1, wherein the power backup system is configured to supply both the backup supply and a three phased load 17 with an AC output voltage simultaneously after termination of a first period of abnormal operation.

9. The power backup system according to claim 1, wherein the first battery string supplying the backup supply is circulated among the battery strings of the multi phased energy storage.

10. The power backup system according to claim 1, wherein, during normal operation, the DC output voltage provided from the first battery string is below the DC voltage provided from the rectifier.

11. The power backup system according to claim 1, wherein the string controller of the first battery string starting up supplying an AC output voltage is configured to communicate with the string controller subsequently starting the second battery string up supplying an AC output voltage so as to ensure 120 degrees phase displacement between the two AC voltages.

12. The power backup system according to claim 1, wherein at least one of the AC output voltages are established while the backup supply is supplied with a DC output voltage.

13. A method of controlling a multi phased energy storage, the multi phased energy storage comprises three battery strings each comprising a plurality of battery modules,
wherein the connectivity of the individual battery module of the plurality of battery modules to its respective battery string is controllable by a switching arrangement associated with the individual battery module,
wherein the switching arrangement comprises four semiconductor switches in an H-bridge configuration,
wherein during normal mode of operation, a backup supply, comprising an AC input and a DC input, is supplied via the AC input from a utility grid and connected, via the DC input, to a first of the battery strings of the multi phased energy storage,
wherein during abnormal mode of operation the backup supply is, during a first period of time, supplied via the DC voltage input by a DC voltage established by the first battery string, and
after expiration of the first period of time being supplied, via the AC voltage input by an AC voltage established by a second battery string.

14. The method according to claim 13, wherein after expiration of the first period of time prior, the switching arrangements of the first and third battery strings are controlled so as to establish an AC output voltage with a phase displacement of 120 degrees to the AC output voltage established by the second battery string.

15. The method according to claim 13, wherein, during normal operation, the DC output voltage is controlled to be lower than the AC voltage.

16. The method according to claim 13, wherein the second and/or the third battery strings can be started up as AC voltage supply before the first battery string is disconnected from the DC input.

17. The method according to claim 13, wherein the control of the switching arrangements of the first and third battery strings is synchronized with the control of the switching arrangements of the second battery string so as to together supply a three phased AC voltage to the AC load.

18. The method according to claim 13, wherein the control of the first and third battery strings are synchronized to each other and to the second battery string so as to facilitate a 120 degrees displacement between the AC voltage outputs of battery strings.

19. The method according to claim 13, wherein a yaw motor, hydraulic pump or a pitch motor connected to the multi phased energy storage is supplied from the AC voltage established by the first, second and third battery strings during abnormal mode of operation.

20. The method according to claim 13, wherein said multi phased energy storage comprises four battery strings of which a first, second and third battery string are supplying power to a load and a fourth is being charged from a power source, wherein said method comprising the following steps of rotation of said first and fourth battery strings:
connecting said fourth battery string in parallel with said first battery string, and
disconnect said first battery string from said fourth battery string.

* * * * *